US010416749B2

(12) United States Patent
Killo et al.

(10) Patent No.: US 10,416,749 B2
(45) Date of Patent: *Sep. 17, 2019

(54) TEMPERATURE CONTROL DEVICE WITH AUTOMATICALLY ADJUSTABLE BACKLIGHTING

(71) Applicant: Lutron Technology Company LLC, Coopersburg, PA (US)

(72) Inventors: Jason C. Killo, Emmaus, PA (US); Donald R. Mosebrook, Coopersburg, PA (US); James P. Steiner, Royersford, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/183,674

(22) Filed: Nov. 7, 2018

(65) Prior Publication Data

US 2019/0073019 A1    Mar. 7, 2019

Related U.S. Application Data

(63) Continuation of application No. 15/165,091, filed on May 26, 2016, now Pat. No. 10,133,337.
(Continued)

(51) Int. Cl.
*G06F 1/32* (2019.01)
*G06F 3/0484* (2013.01)
(Continued)

(52) U.S. Cl.
CPC ............ *G06F 1/3234* (2013.01); *F24F 11/30* (2018.01); *G05D 23/1902* (2013.01);
(Continued)

(58) Field of Classification Search
CPC .. G06F 1/3234; G06F 3/04847; G06F 3/2003; F24F 11/0012; F24F 11/30;
(Continued)

(56) References Cited

U.S. PATENT DOCUMENTS

| 4,741,476 A | 5/1988 | Russo et al. |
| 5,581,599 A | 12/1996 | Tsuji et al. |

(Continued)

*Primary Examiner* — Stephen G Sherman
(74) *Attorney, Agent, or Firm* — Condo Roccia Koptiw LLP

(57) ABSTRACT

A temperature control device (e.g., a thermostat) may be configured to control an internal heat-generating electrical load so as to accurately measure a present temperature in a space around the temperature control device. The temperature control device may comprise a temperature sensing circuit configured to generate a temperature control signal indicating the present temperature in the space, and a control circuit configured to receive the temperature control signal and to control the internal electrical load. The control circuit may be configured to energize the internal electrical load in an awake state and to cause the internal electrical load to consume less power in an idle state. The control circuit may be configured to control the internal electrical load to a first energy level (e.g., a first intensity) during the awake state and to a second energy level (e.g., second intensity) that is less than the first during the idle state.

19 Claims, 6 Drawing Sheets

Related U.S. Application Data

(60) Provisional application No. 62/166,230, filed on May 26, 2015.

(51) Int. Cl.
| | |
|---|---|
| *G06F 1/3234* | (2019.01) |
| *G09G 3/20* | (2006.01) |
| *G05D 23/19* | (2006.01) |
| *F24F 11/30* | (2018.01) |
| *F24F 110/10* | (2018.01) |
| *F24F 11/46* | (2018.01) |
| *F24F 11/52* | (2018.01) |

(52) U.S. Cl.
CPC ....... *G06F 3/04847* (2013.01); *G09G 3/2003* (2013.01); *F24F 11/46* (2018.01); *F24F 11/52* (2018.01); *F24F 2110/10* (2018.01); *G05B 2219/2614* (2013.01); *G09G 2320/0626* (2013.01)

(58) Field of Classification Search
CPC .... F24F 11/46; F24F 11/52; F24F 2011/0075; F24F 2011/0091; F24F 2110/10; G05D 23/1902; G05B 2219/2614; G09G 2320/0626; G09G 3/3406–3426
See application file for complete search history.

(56) References Cited

U.S. PATENT DOCUMENTS

| | | | |
|---|---|---|---|
| 7,361,853 | B2 | 4/2008 | Clegg et al. |
| 7,414,210 | B2 | 8/2008 | Clegg et al. |
| 7,432,460 | B2 | 10/2008 | Clegg et al. |
| 7,432,463 | B2 | 10/2008 | Clegg et al. |
| 7,786,623 | B2 | 8/2010 | Farmer et al. |
| 7,796,057 | B2 | 9/2010 | Swatsky et al. |
| 7,825,891 | B2 | 11/2010 | Yao et al. |
| 8,009,042 | B2 | 8/2011 | Steiner et al. |
| 8,031,164 | B2 | 10/2011 | Herz et al. |
| 8,077,058 | B2 | 12/2011 | Swatsky et al. |
| 8,102,375 | B1 | 1/2012 | Feldstein |
| 8,194,031 | B2 | 6/2012 | Yao et al. |
| 8,451,116 | B2 | 5/2013 | Steiner et al. |
| 8,698,727 | B2 | 4/2014 | Herz et al. |
| 8,698,792 | B2 | 4/2014 | Chang et al. |
| 9,084,310 | B2 | 7/2015 | Bedell et al. |
| 9,553,451 | B2 | 1/2017 | Zacharchuk et al. |
| 10,133,337 | B2 * | 11/2018 | Killo ................ G06F 1/3234 |
| 2007/0241203 | A1 | 10/2007 | Wagner et al. |
| 2009/0219244 | A1 | 9/2009 | Fletcher et al. |
| 2009/0303412 | A1 | 12/2009 | Ake et al. |
| 2012/0091213 | A1 | 4/2012 | Altonen et al. |
| 2013/0080811 | A1 | 3/2013 | Low et al. |
| 2013/0313535 | A1 | 11/2013 | Heo et al. |
| 2014/0156085 | A1 | 6/2014 | Modi et al. |
| 2014/0324232 | A1 | 10/2014 | Modi et al. |

\* cited by examiner

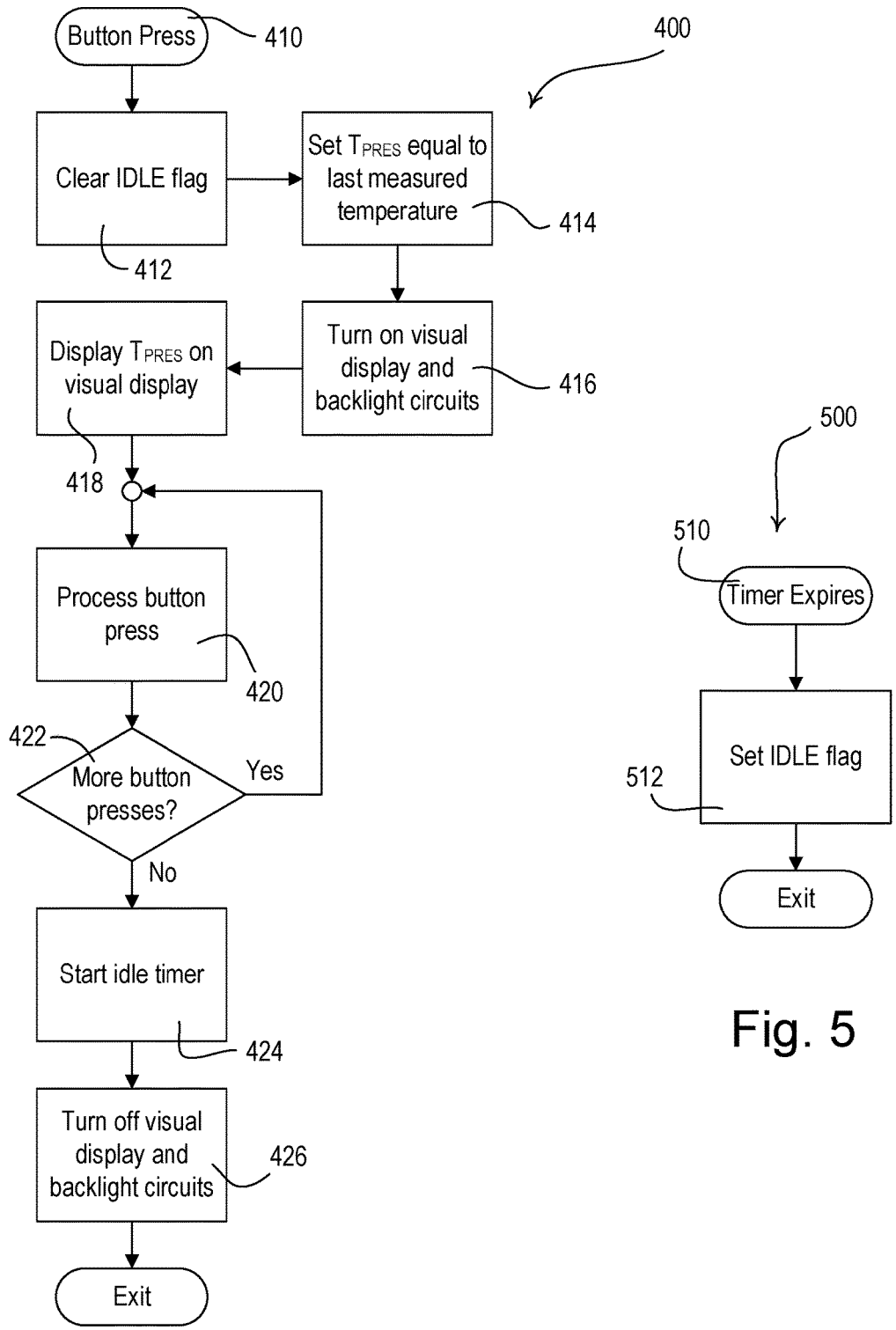

TEMPERATURE CONTROL DEVICE WITH AUTOMATICALLY ADJUSTABLE BACKLIGHTING

CROSS-REFERENCE TO RELATED APPLICATIONS

This application is a continuation of U.S. patent application Ser. No. 15/165,091, filed on May 26, 2016, which claims the benefit of Provisional U.S. Patent Application No. 62/166,230, filed May 26, 2015, the disclosure of which is incorporated herein by reference in its entirety.

BACKGROUND

Home automation systems, which have become increasingly popular, may be used by homeowners to integrate and control multiple electrical and/or electronic devices in their house. For example, a homeowner may connect appliances, lights, blinds, thermostats, cable or satellite boxes, security systems, telecommunication systems, and the like to each other via a wireless network. The homeowner may control these devices using a controller, a remote control device (e.g., such as a wall-mounted keypad), a user interface provided via a phone, a tablet, a computer, and/or the like, directly connected to the network or remotely connected via the Internet. These devices may communicate with each other and the controller to, for example, improve their efficiency, their convenience, and/or their usability.

However, some of these devices may interact with one another in detrimental ways. For example, a thermostat may include a display screen, and the display screen may give off heat when it is operating. The heat given off by the display screen may throw off the measurements provided by the thermostat, such that the thermostat is unable to determine the true temperature in the space, and as such, is unable to properly control the temperature of the space. Moreover, the display screen may operate in a multitude of varying intensities that may each give off a differing amount of heat, further complicating this problem. As such, there is a need for a temperature control device that is configured to automatically adjust its temperature readings to compensate for the heat given off by other internal components, which for example, may operate in more than one mode.

SUMMARY

The present disclosure relates to a load control system for controlling the amount of power delivered to an electrical load, such as a lighting load, and more particularly, to a temperature control device for controlling a heating, ventilation, and air conditioning (HVAC) system.

As described herein, a temperature control device may be configured to control an internal heat-generating electrical load so as to accurately measure a present temperature in a space around the temperature control device. The temperature control device may comprise a temperature sensing circuit configured to generate a temperature control signal indicating the present temperature in the space, and a control circuit configured to receive the temperature control signal and to control the internal electrical load. The control circuit may be configured to energize the electrical load (which causes the electrical load to generate heat) in an awake state and to cause the electrical load to consume less power in an idle state so as to generate less heat. When in the idle state, the control circuit may be configured to periodically sample the temperature control signal to determine a sampled temperature and store the sampled temperature in memory. When in the awake state, the control circuit may be further configured to cease sampling the temperature control signal.

The internal electrical load may be, for example, a button backlight circuit configured to illuminate a button of the temperature control device. The control circuit may be configured to operate in the awake state in response to an actuation of the button (e.g., the control circuit may transition from the idle state to the awake state in response to the actuation of the button). The control circuit may be configured to control the button backlight circuit to a first intensity during the awake state and to a second intensity that is less than the first intensity during the idle state.

In addition, the temperature control device may comprise a light detector circuit configured to measure an ambient light level around the control device. The control circuit may be configured to adjust the first intensity of the button backlight circuit during the active state in response to the measured ambient light level and/or adjust the second intensity of the button backlight circuit during the idle state in response to the measured ambient light level. The control circuit may be configured to turn the button backlight circuit off when the measured ambient light level exceeds an ambient light threshold during the idle state.

Although described generally in association with controlling a temperature, it will be appreciated that the temperature control device disclosed herein may be configured to measure and/or control other parameters of the environment including, for example, a relative humidity (RH) level in the space around the temperature control device. Accordingly, features and functionalities described in the context of measuring and/or controlling a temperature may be applicable to the measurement and/or control of one or more other parameters (e.g., relative humidity) as well.

BRIEF DESCRIPTION OF THE DRAWINGS

FIG. 4 is a flowchart of an example button procedure.

FIG. 5 is a flowchart of an example timer procedure.

DETAILED DESCRIPTION

Figure 1:
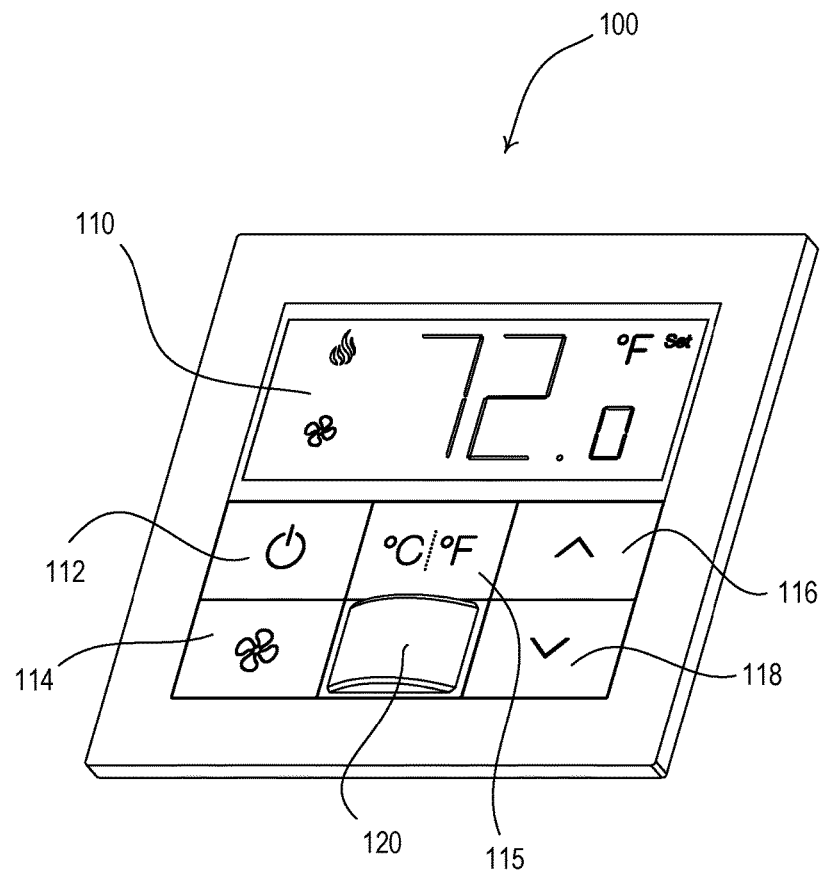
FIG. 1 is a perspective view of an example temperature control device (e.g., a wall-mounted thermostat).

FIG. 1 is a perspective view of an example temperature control device (e.g., a wall-mounted thermostat 100) for controlling a heating, ventilation, and air conditioning (HVAC) system. The thermostat 100 may be configured to control the HVAC system to adjust a present temperature $T_{PRES}$ in a space in which the thermostat is installed towards a setpoint temperature $T_{SET}$. The thermostat 100 may comprise an internal temperature sensor (not shown) for measuring the present temperature $T_{PRES}$ in the space. Alternatively, the HVAC system could simply comprise a heating system or a cooling system.

The thermostat 100 may be configured to communicate (e.g., transmit and/or receive) digital messages with one or more external control devices via a communication link. The communication link may comprise a wired communication link or a wireless communication link, such as a radio-frequency (RF) communication link. The thermostat 100 may be configured to adjust the setpoint temperature $T_{SET}$ in response to received digital messages. In addition, the thermostat 100 may be configured to transmit the present temperature $T_{PRES}$ and/or the setpoint temperature $T_{SET}$ via one or more digital messages. The thermostat 100 may be coupled to the HVAC system via a digital communication link, such as an Ethernet link, a BACnet® link, or a Modbus link. The HVAC system may comprise, for example, a building management system (BMS). Alternatively or additionally, the communication link could comprise a traditional analog control link for simply turning the HVAC system on and off. Examples of load control systems having temperature control devices, such as the thermostat 100, are described in greater detail in commonly-assigned U.S. Patent Application Publication No. 2012/0091213, published Apr. 19, 2012, entitled WALL-MOUNTABLE TEMPERATURE CONTROL DEVICE FOR A LOAD CONTROL SYSTEM HAVING AN ENERGY SAVINGS MODE, and U.S. Patent Application Publication No. 2014/0001977, published Jan. 2, 2014, entitled LOAD CONTROL SYSTEM HAVING INDEPENDENTLY-CONTROLLED UNITS RESPONSIVE TO A BROADCAST CONTROLLER, the entire disclosures of which are hereby incorporated by reference.

The thermostat 100 may be configured to control the HVAC system in response to occupancy and/or vacancy conditions in the space around (e.g., in the vicinity of) the thermostat 100. The load control device 100 may comprise an internal detector, e.g., a pyroelectric infrared (PIR) detector, for receiving infrared energy from an occupant in the space via a lens 120 to sense the occupancy or vacancy condition in the space. Alternatively or additionally, the internal detector could comprise an ultrasonic detector, a microwave detector, or any combination of PIR detectors, ultrasonic detectors, and microwave detectors. The thermostat 100 may be configured to turn the HVAC system on in response to detecting an occupancy condition in the space and to turn the HVAC system off in response to detecting a vacancy condition in the space. An example of a wall-mounted control device configured to control an electrical load in response to detecting occupancy and vacancy conditions in described in greater detail in commonly-assigned U.S. Patent Application Publication No. 2012/0313535, published Dec. 13, 2012, entitled METHOD AND APPARATUS FOR ADJUSTING AN AMBIENT LIGHT THRESHOLD, the entire disclosure of which is hereby incorporated by reference.

The thermostat 100 may comprise a visual display 110 for displaying the present temperature $T_{PRES}$ and/or the setpoint temperature $T_{SET}$. In addition, the visual display 110 may display a mode of the HVAC system (e.g., heating or cooling) and/or a status of a fan of the HVAC system (e.g., on or off, speed, etc.). The visual display 110 may comprise, for example, a liquid crystal display (LCD) screen or a light-emitting diode (LED) screen. The visual display 110 may be backlight by one or more lights sources (e.g., white backlight LEDs). The thermostat 100 may comprise a power button 112 for turning on and off the HVAC system. The thermostat 100 may comprise a fan button 114 for turning on and off the fan (e.g., and for adjusting the speed of the fan) of the HVAC system. The thermostat 100 may also comprise a units-adjust button 115 for adjusting the units in which the present temperature $T_{PRES}$ and/or the setpoint temperature $T_{SET}$ are displayed on the visual display 110 (e.g., Celsius or Fahrenheit). The thermostat 100 may comprise a raise button 116 and a lower button 118 for respectively raising and lowering the setpoint temperature $T_{SET}$ of the thermostat. The thermostat 100 may also be configured to adjust the setpoint temperature $T_{SET}$ in response to the present time of day according to a predetermined timeclock schedule.

One or more of the buttons 112-118 may comprise indicia, such as text or icons, indicating the specific function of the button. The buttons 112-118 may be backlit to allow the indicia to be read in a wide range of ambient light levels. Each button 112-118 may be made of a translucent (e.g., transparent, clear, and/or diffusive) material, such as plastic. The buttons 112-118 may be illuminated by one or more light sources (e.g., LEDs) located behind each button (e.g., inside of the thermostat 100). In addition, the buttons 112-118 may each have a metallic surface. Specifically, each button 112-118 may have a translucent body (not shown) and an opaque material, e.g., a metallic sheet (not shown), adhered to a front surface of the body. The indicia may be etched into the metallic sheet of each button. The illumination from the LEDs may shine through the translucent body, but not through the metallic sheet, such that the indicium of each button (that is etched away from the metallic sheet) is illuminated.

When the thermostat 100 is presently being used (e.g., a user is presently actuating one or more of the buttons 112-118), the thermostat may operate in an awake state in which the visual display 110 may be turned on and backlit and the buttons 112-118 may each be illuminated to an awake surface illumination intensity $L_{SUR1}$ (e.g., a bright level). When the thermostat 100 is not being used (e.g., the buttons 112-118 are not presently being actuated), the thermostat may operate in an idle state in which the backlight for the visual display 110 may be dimmed and the buttons 112-118 may each be illuminated to an idle surface illumination intensity $L_{SUR2}$ (e.g., a dim level). The thermostat 100 may be configured to wait for an amount of time after the last button press (e.g., approximately 10 seconds) before dimming the backlight for the visual display 110 and the LEDs behind the buttons 112-118. The idle surface illumination intensity $L_{SUR2}$ may be less than the awake surface illumination intensity $L_{SUR1}$ to provide energy savings in the idle state and/or to reduce the heat generated by the backlight LEDs to thus improve the accuracy of the measurements of the present temperature $T_{PRES}$ by the internal temperature sensor. In addition, the visual display may be turned off and not backlit, and the LEDs behind the buttons 112-118 may be turned off in the idle state.

The ambient light level in the room in which the thermostat 100 is installed may affect a user's ability to read the indicia on the buttons 112-118. For example, if the contrast between the brightness of the illuminated indicia and the brightness of the adjacent surface of the button is too low, the illuminated indicia may appear washed out to the user. Accordingly, the thermostat 100 may comprise an ambient light detection circuit, which may be configured to measure the ambient light level in the room in which the thermostat is installed. For example, the ambient light detection circuit may be located behind the lens 120 and may receive light through the lens to make a determination of the ambient light level in the room. Alternatively, the thermostat 100 may comprise an opening (not shown) through which the ambient light detection circuit may receive light. The thermostat 100 may also comprise a light pipe for directing light from outside of the keypad to the ambient light detection circuit.

The thermostat 100 may be configured to adjust the awake and idle surface illumination intensities $L_{SUR1}$, $L_{SUR2}$ in response to the measured ambient light level. For example, the thermostat 100 may be configured to increase the awake and idle surface illumination intensities $L_{SUR1}$, $L_{SUR2}$ if the ambient light level increases and decrease the awake and idle surface illumination intensities $L_{SUR1}$, $L_{SUR2}$ if the ambient light level decreases.

Figure 2:
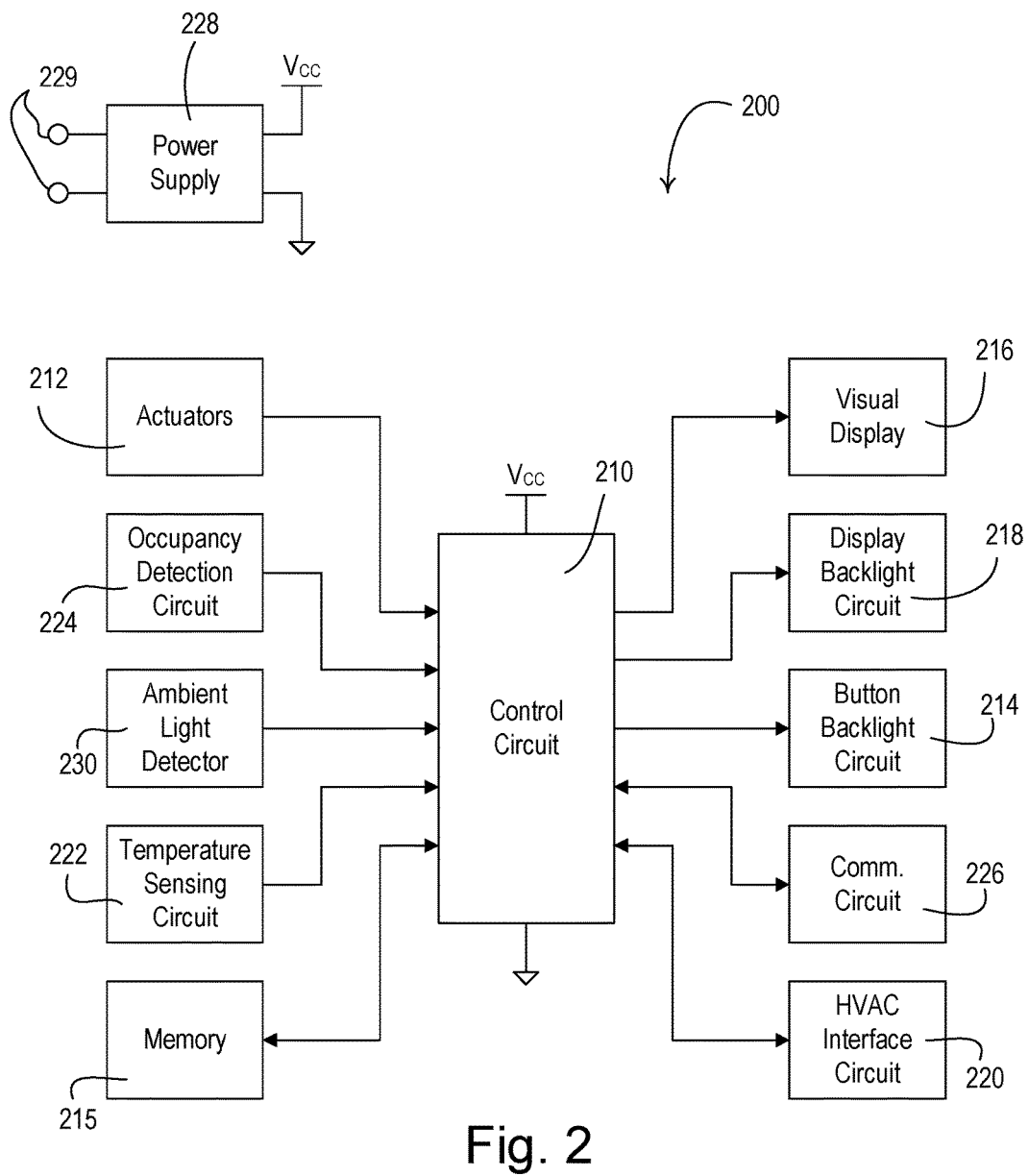
FIG. 2 is a block diagram of an example temperature control device.

FIG. 2 is a block diagram of an example temperature control device 200 that may be deployed as, for example, the thermostat 100 shown in FIG. 1. The temperature control device 200 may comprise a control circuit 210, which may include one or more of a processor (e.g., a microprocessor), a microcontroller, a programmable logic device (PLD), a field programmable gate array (FPGA), an application specific integrated circuit (ASIC), or any suitable processing device. The temperature control device 200 may comprise one or more actuators 212 (e.g., mechanical tactile switches), which may be actuated in response to actuations of the buttons 112-118. The control circuit 210 may be coupled to the actuators 212 for receiving user inputs.

The temperature control device 200 may comprise a button backlight circuit 214 for illuminating indicia on one or more buttons (e.g., the buttons 112-118 of the thermostat 100). For example, the button backlight circuit 214 may comprise one or more LEDs located behind or to the side of each of the buttons. The control circuit 210 may be configured to control an LED current conducted through the LEDs of the button backlight circuit 214 to dim a surface illumination intensity of each button, e.g., by pulse-width modulating the LED current and adjusting a duty cycle $DC_{LED}$ of the pulse-width modulated LED current. The control circuit 210 may be configured to control the button backlight circuit 214 to illuminate the buttons to the awake surface illumination intensity $L_{SUR1}$ in the awake state and to the idle surface illumination intensity $L_{SUR2}$ in the idle state. The awake surface illumination intensity $L_{SUR1}$ may be brighter than the idle surface illumination intensity $L_{SUR2}$. To illuminate the buttons to the awake surface illumination intensity $L_{SUR1}$, the control circuit 210 may pulse-width modulate the LED current using a first LED duty cycle $DC_{LED1}$. To illuminate the buttons to the idle surface illumination intensity $L_{SUR2}$, the control circuit 210 may pulse-width modulate the LED current using a second LED duty cycle $DC_{LED2}$, which may be smaller than the first LED duty cycle $DC_{LED1}$.

The temperature control device 200 may include a memory 215 communicatively coupled to the control circuit 210. The control circuit 210 may be configured to use the memory 215 for the storage and/or retrieval of, for example, a setpoint temperature $T_{SET}$ and/or a present temperature $T_{PRES}$ in the space in which the temperature control device 200 is installed, the awake surface illumination intensity $L_{SUR1}$, and/or to the idle surface illumination intensity $L_{SUR2}$. The memory 215 may be implemented as an external integrated circuit (IC) or as an internal circuit of the control circuit 210.

The temperature control device 200 may comprise a visual display 216 (e.g., the visual display 110) for displaying status information for a user, e.g., the present temperature $T_{PRES}$, the setpoint temperature $T_{SET}$, a mode of the HVAC system (e.g., heating or cooling), and/or a status of a fan of the HVAC system (e.g., on/off, and/or speed). For example, the control circuit 210 may be configured to update the present temperature $T_{PRES}$ displayed on the visual display 216 every 50 milliseconds. The temperature control device 200 may also comprise a display backlight circuit 218 (e.g., having one or more LEDs) for illuminating the visual display 216. The control circuit 210 may be configured to turn the display backlight circuit 218 on and off and/or adjust the intensity of the display backlight circuit.

The temperature control device 200 may comprise an HVAC interface circuit 220, which may be coupled to an HVAC system that controls the present temperature $T_{PRES}$ in the space. The HVAC interface circuit 220 may comprise a digital communication circuit for communicating with the HVAC system via a digital communication link, such as an Ethernet link, a BACnet® link, or a Modbus link. Alternatively or additionally, the HVAC interface circuit 220 may comprise an analog HVAC control circuit for controlling the HVAC system via a traditional analog control link, e.g., for simply turning the HVAC system on and off. The control circuit 210 may be configured to control the HVAC system to adjust the present temperature $T_{PRES}$ in the space towards the setpoint temperature $T_{SET}$.

The temperature control device 200 may comprise a temperature sensing circuit 222 for measuring the present temperature $T_{PRES}$ in the space in which the temperature control device 200 is installed. The temperature sensing circuit 222 may comprise a temperature sensor integrated circuit, for example, from the Si70xx family of temperature sensors manufactured by Silicon Labs. The temperature control device 200 may generate a temperature control signal $V_{TEMP}$, which may indicate the measured temperature. The control circuit 210 may be configured to receive the temperature control signal $V_{TEMP}$ and may store the present temperature $T_{PRES}$ in the memory 215. For example, the control circuit 210 may be configured to periodically sample the temperature control signal $V_{TEMP}$ and store the temperature sample in the memory 215 (e.g., every second). The control circuit 210 may be configured to average a predetermined number of temperature samples (e.g., the previous 16 temperature samples) stored in the memory 215 to determine the present temperature $T_{PRES}$, which may also be stored in the memory 215. The control circuit 210 may be configured to compare the present temperature $T_{PRES}$ to the setpoint temperature $T_{SET}$ and to control the HVAC system to adjust the present temperature $T_{PRES}$ in the space towards the setpoint temperature $T_{SET}$ if the present temperature $T_{PRES}$ is outside of a setpoint temperature range around the setpoint temperature $T_{SET}$ (e.g., +/−1° F.).

The temperature control device 200 may also comprise an occupancy detection circuit 224 for detecting an occupancy or vacancy condition in the vicinity of the load control device. The occupancy detection circuit 224 may comprise a detector, e.g., a pyroelectric infrared (PIR) detector, an ultrasonic detector, and/or a microwave detector, for detecting an occupancy or vacancy condition in the space. For example, a PIR detector may be operable to receive infrared energy from an occupant in the space around the temperature control device 200 through a lens (e.g., the lens 120 shown in FIG. 1) to thus sense the occupancy condition in the space. The control circuit 210 may be configured to determine a vacancy condition in the space after a timeout period expires since the last occupancy condition was detected. The control circuit 210 may be configured to turn the HVAC system on and off in response to the occupancy detection circuit 224 detecting occupancy and/or vacancy conditions.

The temperature control device 200 may further comprise a communication circuit 226, such as, a wired communication circuit or a wireless communication circuit (e.g., an RF transmitter coupled to an antenna for transmitting RF signals). The control circuit 210 may be coupled to the communication circuit 214 and may be configured to adjust the setpoint temperature $T_{SET}$ in response to received digital messages. The control circuit 210 may also be configured to transmit the present temperature $T_{PRES}$ and/or the setpoint temperature $T_{SET}$ via the digital messages. Alternatively, the communication circuit 226 may include an RF receiver for receiving RF signals, an RF transmitter for transmitting RF signals, an RF transceiver for transmitting and receiving RF signals, and/or an infrared (IR) transmitter for transmitter IR signals.

The temperature control device 200 may comprise a power supply 228 for generating a direct-current (DC) supply voltage $V_{CC}$ for powering the control circuit 210 and the other low-voltage circuitry of the temperature control device. The power supply 228 may be coupled to an alternating-current (AC) power source or an external DC power source via electrical connections 229. Alternatively or additionally, the temperature control device 200 may comprise an internal power source (e.g., one or more batteries) in place of or for supplying power to the power supply 228.

The temperature control device 200 may further comprise an ambient light detector 230 (e.g., an ambient light detection circuit) for measuring an ambient light level LAMB in the room in which the temperature control device 200 is installed. The ambient light detector 230 may generate an ambient light detect signal $V_{AMB}$, which may indicate the ambient light level LAMB and may be received by the control circuit 210. The control circuit 210 may be configured to adjust the awake and idle surface illumination intensities $L_{SUR1}$, $L_{SUR2}$ in response to the measured ambient light level LAMB as determined from ambient light detect signal $V_{AMB}$. For example, the control circuit 210 may be configured to increase the awake and idle surface illumination intensities $L_{SUR1}$, $L_{SUR2}$ if the ambient light level increases. The control circuit 210 may be configured to decrease the awake and idle surface illumination intensities $L_{SUR1}$, $L_{SUR2}$ if the ambient light level decreases.

Figure 3:
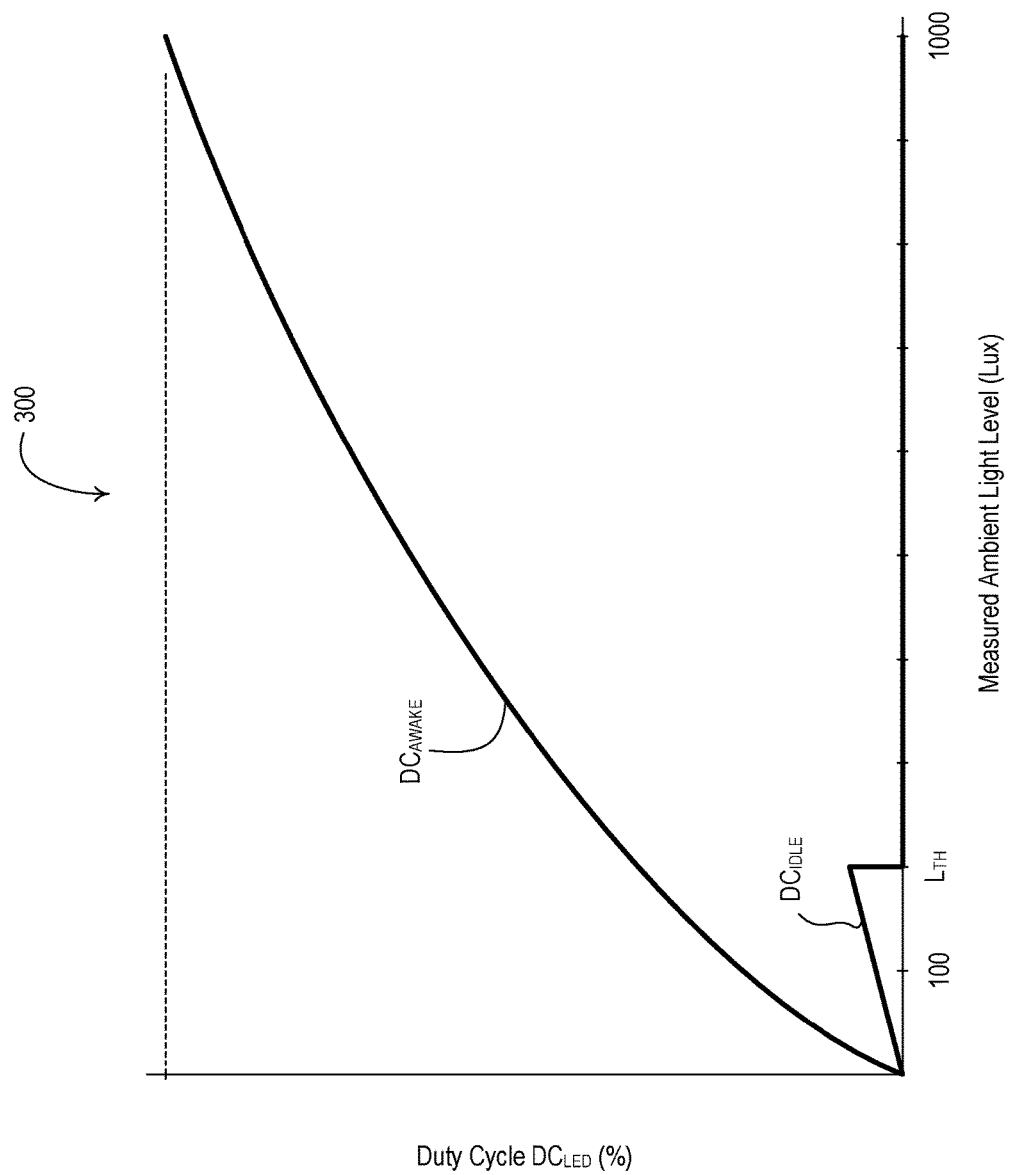
FIG. 3 illustrates example adjustment curves for adjusting a duty cycle of a current conducted through light-emitting diodes illuminating buttons of a temperature control device in response to a measured ambient light level.

The control circuit 210 may be configured to adjust the awake and idle surface illumination intensities $L_{SUR1}$, $L_{SUR2}$ by adjusting the duty cycle $DC_{LED}$ through each of the LED behind the respective buttons. For example, the control circuit 210 may be configured to adjust the first duty cycle $DC_{LED1}$ of the LED current conducted through the LEDs of the button backlight circuit 214 in response to the measured ambient light level LAMB according an awake LED adjustment curve $DC_{AWAKE}$, and to adjust the second duty cycle $DC_{LED2}$ of the LED current conducted through the LEDs of the button backlight circuit 214 in response to the measured ambient light level LAMB according an idle LED adjustment curve $DC_{IDLE}$. FIG. 3 illustrates example awake and idle adjustment curves $DC_{AWAKE}$, $DC_{IDLE}$ for adjusting the duty cycle of the LED current of the button backlight circuit 214 in response to the measured ambient light level LAMB. The awake LED adjustment curve $DC_{AWAKE}$ and the idle LED adjustment curve $DC_{IDLE}$ may be stored in the memory 215.

The heat generated by the LEDs of the button backlight circuit 214 may affect the temperature readings measured by the temperature sensing circuit 222, such that the temperature control signal $V_{TEMP}$ may not indicate the actual present temperature $T_{PRES}$ in the space. In addition, the heat generated by the visual display 216 and LEDs of the display backlight circuit 218 may also affect the temperature readings measured by the temperature sensing circuit 222. For example, since the awake surface illumination intensity $L_{SUR1}$ and the intensity of the display backlight circuit may be greater when the temperature control device 200 is in the active state as compared to the inactive state, the temperature control signal $V_{TEMP}$ may further deviate from the actual present temperature $T_{PRES}$ in the space when the temperature control device 200 is in the active state. For example, the heat generated by the button backlight circuit 214, the visual display 216, and the display backlight circuit 218 may cause the temperature inside of the temperature control device to be approximately 5° F. greater than the actual present temperature $T_{PRES}$ in the space when the temperature control device 200 is in the active state.

Accordingly, the control circuit 210 may be configured to cease periodically sampling the temperature control signal $V_{TEMP}$ and storing the present temperature $T_{PRES}$ in the memory 215 in the awake state. The control circuit 210 may be configured to use the last sampled temperature stored in the memory 215 as the present temperature $T_{PRES}$ during the awake state, where for example, the last sampled temperature stored in the memory 215 may have been sampled during the immediately preceding idle state. During the awake state, the control circuit 210 may be configured to display the present temperature $T_{PRES}$ on the visual display 216. The control circuit 210 may also be configured to compare the present temperature $T_{PRES}$ to the setpoint temperature $T_{SET}$ and may be configured to control the HVAC system if the present temperature $T_{PRES}$ is outside of the setpoint temperature range in the awake state (e.g., if the setpoint temperature $T_{SET}$ is adjusted while in the awake state).

The control circuit 210 may be further configured to wait for an idle time period $T_{IDLE-WAIT}$ after the last button press before changing from the awake state to the idle state. Once in the idle state, the control circuit 210 may once again sample the temperature control signal $V_{TEMP}$ to determine the present temperature $T_{PRES}$. For example, the idle time period $T_{IDLE-WAIT}$ may be long enough to allow the temperature inside of the temperature control device 200 to decrease to an idle steady state temperature that does not significantly affect the temperature readings measured by the temperature sensing circuit 222. The idle time period $T_{IDLE-WAIT}$ may be a predetermined amount of time (e.g., approximately 180 seconds) stored in the memory 215. Alternatively, the idle time period $T_{IDLE-WAIT}$ may be a function of the first duty cycle $DC_{LED1}$ used during the awake state (e.g., as determined from the awake adjustment curve $DC_{AWAKE}$ shown in FIG. 3).

When operating in the idle state, the control circuit 210 may be configured to control the button backlight circuit 214 to ensure that the heat generated by the LEDs of the button backlight circuit may not greatly affect the temperature readings measured by the temperature sensing circuit 222. For example, the control circuit 210 may limit the intensity to which each of the LEDs of the button backlight circuit 214 are controlled during the idle state. In addition, as shown in FIG. 3, the control circuit 210 may turn off the LEDs of the button backlight circuit 214 when the ambient light level LAMB exceeds an ambient light threshold $L_{TH}$ (e.g., approximately 200 Lux) above which the indicia on the buttons may be easily distinguished by as user.

The temperature control device 200 may be configured to measure and/or control other parameters of the space around the temperature control device. For example, the temperature control device may comprise a humidity sensing circuit (e.g., including a humidity sensing integrated circuit) that may be configured to measure a relative humidity level of the surround space. The temperature control device 200 may be configured to adjust the relative humidity level based on the measurement. The humidity sensing circuit may be configured to measure the present temperature $T_{PRES}$ in the space and use the present temperature $T_{PRES}$ to determine the relative humidity in the space. The heat generated by the LEDs of the button backlight circuit 214, the visual display 216, and/or the LEDs of the display backlight circuit 218 may affect the relative humidity readings output by the humidity sensing circuit. In addition, the temperature sensing circuit 222 may be configured as a temperature and humidity sensing circuit. Accordingly, the techniques described herein for mitigating the impact of the heat (and thus the deviation of the readings from the actual parameters) may be applied to the measurement and/or control of the relative humidity level. For example, a last sampled relative humidity level (e.g., sampled during the immediately preceding idle state) may be stored in the memory 215 and used during the awake state.

Figure 6:
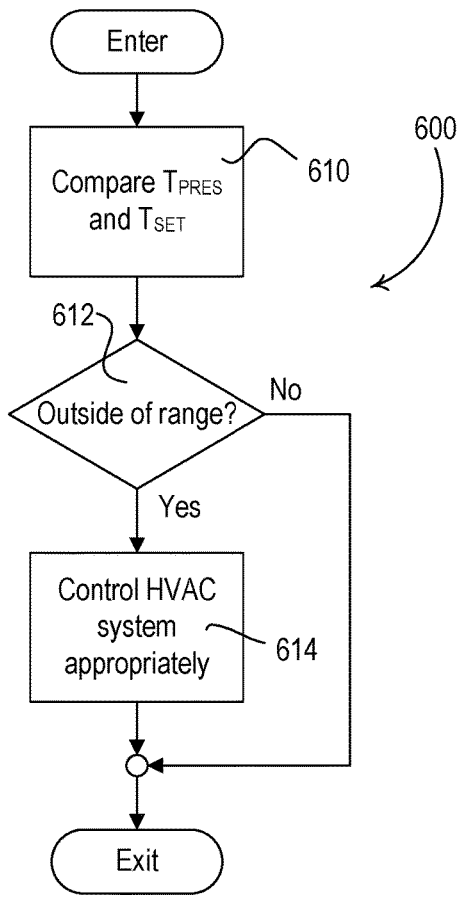
FIG. 6 is a flowchart of an example temperature control procedure.
Figure 7:
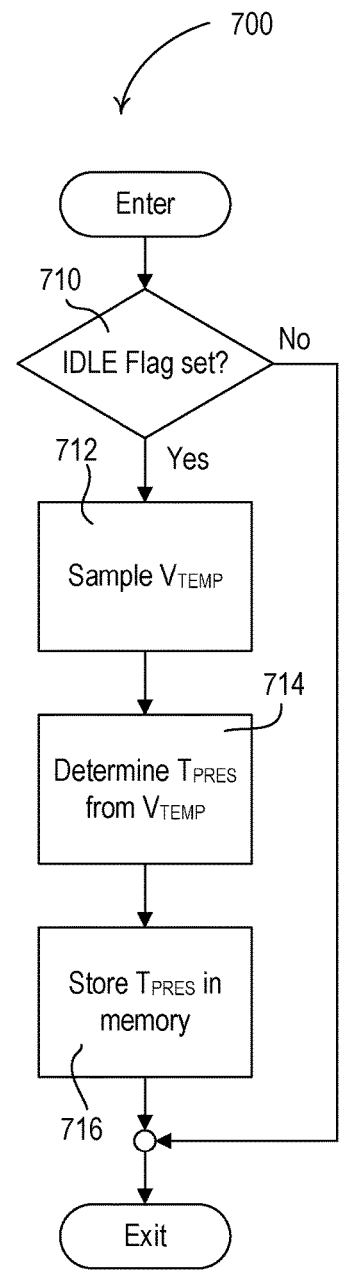
FIG. 7 is a flowchart of an example temperature measurement procedure.
Figure 8:
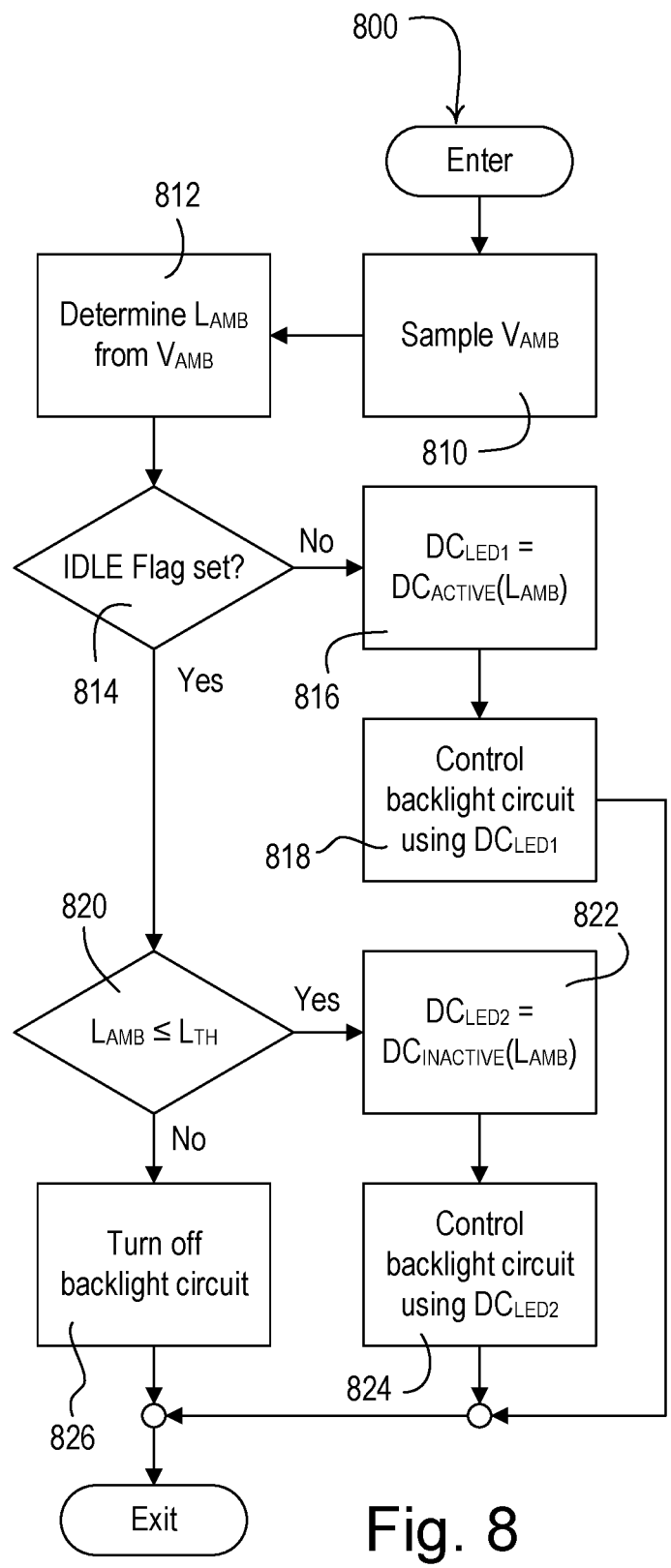
FIG. 8 is a flowchart of an example ambient light detection procedure.

FIGS. 4-8 are simplified flowcharts of example procedures that may be executed by a control circuit of a temperature control device (e.g., a control circuit of the thermostat 100 of FIG. 1 and/or the control circuit 210 of the temperature control device of FIG. 2) to control an HVAC system and adjust the intensity of one or more backlit buttons of the temperature control device. FIG. 4 is a flowchart of an example button procedure 400 that may be executed by the control circuit in response to an actuation of a button (e.g., one of the buttons 112-118). FIG. 5 is a flowchart of an example timer procedure 500 that may be executed by the control circuit when a timer expires, e.g., after an amount of time since a button was last pressed. FIG. 6 is a flowchart of a temperature control procedure 600 that may be executed periodically by the control circuit to control the HVAC system. FIG. 7 is a flowchart of an example temperature measurement procedure 700 that may be executed periodically by the control circuit in order to measure and store in memory a present temperature $T_{PRES}$ in a space around the temperature control device. FIG. 8 is a flowchart of an example ambient light detection procedure 800 that may be executed periodically by the control circuit in order to measure an ambient light level LAMB in the space around the temperature control device and control a backlight circuit for the backlit buttons (e.g., the button backlight circuit 214). During the procedures 400, 500, 600, 700, 800 of FIGS. 4-8, the control circuit may use an IDLE flag to keep track of whether the temperature control device is operating in an idle state during which the temperature control device is not being used (e.g., buttons are not being actuated), or in an awake state during which the temperature control device is presently being used.

Referring to procedure 400, after detecting a button press at 410, the control circuit may clear the IDLE flag at 412 to indicate the temperature control device is operating in the awake state. At 414, the control circuit may set the present temperature $T_{PRES}$ equal to the last temperature sample stored in memory. At 416, the control circuit may increase the amount of power consumed by one or more electrical loads of the temperature control device, such as a visual display (e.g., the visual display 110, 216), a backlight circuit for the visual display (e.g., the display backlight circuit 218) and/or a backlight circuit for the backlit buttons (e.g., the button backlight circuit 214). For example, the control circuit may turn on the visual display and the backlight circuit for the visual display at 416. In addition, the control circuit may turn on or increase the intensity of the backlight circuit for the backlit buttons at 416. At 418, the control circuit may display the present temperature $T_{PRES}$ on the visual display. At 420, the control circuit may process the button press (e.g., the button press received at 410). For example, if a setpoint adjustment button (e.g., the raise button 116 or the lower button 118 of the thermostat 100) was actuated, the control circuit may adjust the setpoint temperature $T_{SET}$ appropriately in response to the actuation. At 422, the control circuit may determine whether more than one button was pressed at 410. If so, when the button procedure 400 may loop around to process the additional button press at 420.

If the control circuit determines that no more buttons have been actuated at 422, the control circuit may start (or restart) an idle timer at 424. For example, the control circuit may initialize the idle timer with an idle time period $T_{IDLE-WAIT}$ and may start the idle timer decreasing with respect to time at 424. The control circuit may recall the value of the idle time period $T_{IDLE-WAIT}$ from memory at 424. Alternatively, the control circuit may determine the value of the idle time period $T_{IDLE-WAIT}$ as a function of the present intensity of the backlight circuit for the backlit buttons. At 426, the control circuit may reduce the amount of power consumed by the electrical loads of the temperature control device (e.g., the visual display, the backlight circuit for the visual display, and/or the backlight circuit for the backlit buttons). For example, the control circuit may turn off the visual display and the backlight circuit for the visual display at 426. In addition, the control circuit may turn off or decrease the intensity of the backlight circuit for the backlit buttons at 426. For example, the control circuit may wait for another button press for a predetermined amount of time (e.g., ten seconds) at 422 before reducing the amount of power consumed by the electrical loads of the temperature control device at 426. After reducing the amount of power consumed by the electrical loads of the temperature control device at 426, the button procedure 400 may exit.

When the idle timer expires (e.g., the idle timer started at 424 of procedure 400), the control circuit may execute the timer procedure 500 as shown in FIG. 5. Specifically, after the idle timer expires at 510, the control circuit may set the IDLE flag at step 512, before the timer procedure 500 exits.

Referring to FIG. 6, the control circuit may execute the temperature control procedure 600 periodically (e.g., every second) to adjust the present temperature $T_{PRES}$ towards the setpoint temperature $T_{SET}$. At 610, the control circuit may compare the present temperature $T_{PRES}$ to the setpoint temperature $T_{SET}$. The control circuit may determine whether the present temperature $T_{PRES}$ is within a setpoint temperature range around the setpoint temperature $T_{SET}$ (e.g., +/-1° F.) at 612. If the present temperature $T_{PRES}$ is within a setpoint temperature range around the setpoint temperature $T_{SET}$ at 612, the control circuit may not control the HVAC system before the temperature control procedure 600 exits. However, if the present temperature $T_{PRES}$ is outside of the setpoint temperature range around the setpoint temperature $T_{SET}$ at 612, the control circuit may control the HVAC system appropriately so as to adjust the present temperature $T_{PRES}$ towards the setpoint temperature $T_{SET}$ at 614. After controlling the HVAC system appropriately, the temperature control procedure 600 exits.

Referring to FIG. 7, the control circuit may execute the temperature measurement procedure 700 periodically (e.g., every second) to measure and store the present temperature $T_{PRES}$ in the space around the temperature control device. The control circuit may determine whether the IDLE flag is set at 710 (e.g., whether the temperature control device is operating in the idle state). If the IDLE flag is set at 710, the control circuit may sample the temperature control signal $V_{TEMP}$ at 712 and determine the present temperature $T_{PRES}$ from the temperature control signal $V_{TEMP}$ at 714. The control circuit may then store the present temperature $T_{PRES}$ in memory at 716, before the temperature measurement procedure 700 exits. If the IDLE flag is not set at 710 (e.g., the temperature control device is operating or was just operating in the awake state), the temperature measurement procedure 700 exits. If the IDLE flag is not set at 710, then the present temperature $T_{PRES}$ may be that which was previously measured and stored by the control circuit when the temperature control device was last in idle state.

Referring to FIG. 8, the control circuit may execute the ambient light detection procedure 800 periodically (e.g., every 100 milliseconds) in order to measure an ambient light level LAMB in the space around the temperature control device. The control circuit may sample the ambient light detect signal $V_{AMB}$ at 810, and then determine the measured ambient light level LAMB using the magnitude of the ambient light detect signal $V_{AMB}$ at 812. At 814, the control circuit may determine whether the IDLE flag is set (e.g., whether the temperature control device is operating or was just operating in the awake state). If the IDLE flag is not set at 814, the control circuit may determine the first LED duty cycle $DC_{LED1}$ from the awake adjustment curve $DC_{AWAKE}$ (e.g., using the awake adjustment curve $DC_{AWAKE}$ shown in FIG. 3) using the measured ambient light level LAMB at 816. The control circuit may then pulse-width modulate the LED current conducted through the button backlight circuit using the first LED duty cycle $DC_{LED1}$ at 818.

If the IDLE flag is set at 814 (e.g., the temperature control device is operating in the idle state), then the control device may determine whether the measured ambient light level LAMB is less than or equal to an ambient light threshold $L_{TH}$ (e.g., approximately 200 Lux) at 820. If the measured ambient light level LAMB is less than or equal to an ambient light threshold $L_{TH}$ at 820, the control circuit may determine the second LED duty cycle $DC_{LED2}$ from the idle adjustment curve $DC_{IDLE}$ (e.g., using the idle adjustment curve $DC_{IDLE}$ shown in FIG. 3) using the measured ambient light level LAMB at 822. The control circuit may then pulse-width modulate the LED current conducted through the button backlight circuit using the second LED duty cycle $DC_{LED2}$ at 824, before the ambient light detection procedure 800 exits. If the measured ambient light level LAMB is greater than the ambient light threshold $L_{TH}$ at 820, the control circuit may turn off the backlight circuit at 826, before the ambient light detection procedure 800 exits.

What is claimed is:

1. A method for controlling an HVAC system by a control circuit of a temperature control device, the method comprising:
   receiving a temperature control signal indicating a temperature in a space around the temperature control device;
   receiving a set point temperature;
   controlling, in an idle state, an internal electrical load to a first state;
   sampling, in the idle state, the temperature control signal;
   determining, in the idle state, a sampled temperature based on the temperature control signal;
   storing, in the idle state, the sampled temperature in memory;
   controlling, in an awake state, the internal electrical load to a second state, wherein the internal electrical load consumes more power in the second state than in the first state;
   ceasing sampling of the temperature control signal, in the awake state;
   retrieving, in the awake state, the sampled temperature stored in the memory during the idle state;
   comparing the retrieved sampled temperature to the set point temperature; and
   based on comparing the retrieved sampled temperature to the set point temperature, controlling the HVAC system.

2. The method of claim 1, further comprising:
   entering the awake state in response to an actuation of a button.

3. The method of claim 2, wherein controlling the internal electrical load comprises controlling a button backlight circuit configured to illuminate the button with a first duty cycle during the awake state and with a second duty cycle during the idle state, the second duty cycle having a decreased on time percentage compared to the first duty cycle, the decreased on time percentage of the second duty cycle being greater than zero percent.

4. The method of claim 3, further comprising:
   controlling the button backlight circuit in response to an ambient light level around the temperature control device measured by a light detector circuit.

5. The method of claim 4, further comprising adjusting the second duty cycle of the button backlight circuit during the idle state in response to the ambient light level.

6. The method of claim 4, further comprising turning off the button backlight circuit when the ambient light level exceeds an ambient light threshold during the idle state.

7. The method of claim 3, further comprising waiting for a period of time after the actuation of the button before returning to the idle state.

8. The method of claim 7, wherein the period of time is a predetermined value stored in the memory.

9. The method of claim 7, wherein the period of time is a function of the first duty cycle during the awake state.

10. The method of claim 1, further comprising displaying a present temperature on a visual display.

11. The method of claim 1, wherein the internal electrical load comprises a visual display for displaying information for a user, further wherein controlling the internal electrical load to the first state comprises turning the visual display off during the idle state; and wherein controlling the internal electrical load to the second state comprises turning the visual display on during the awake state.

12. The method of claim 1, wherein the internal electrical load comprises a display backlight circuit for a visual display, further wherein controlling the internal electrical load to the first state comprises turning the display backlight circuit off during the idle state; and wherein controlling the internal electrical load to the second state comprises turning the display backlight circuit on during the awake state.

13. A method comprising:
   sampling a temperature signal, the temperature signal indicating a temperature in a space around a temperature control device;
   determining, in an idle state, a sampled temperature based on the temperature signal;
   storing, in the idle state, the sampled temperature in memory;
   controlling, in the idle state, an internal electrical load to a first state; and
   controlling, in an awake state, the internal electrical load to a second state, wherein the internal electrical load consumes more power in the second state than in the first state;
   ceasing sampling of the temperature signal, in the awake state;

retrieving, in the awake state, the sampled temperature stored in the memory during the idle state;

comparing the retrieved sampled temperature to a set point temperature; and based on comparing the retrieved sampled temperature to the set point temperature, controlling an HVAC system.

14. The method of claim 13, further comprising transitioning from the idle state to the awake state in response to an actuation of a button; and waiting for a period of time after the actuation of the button before returning to the idle state, the period of time being a predetermined value stored in the memory or a function of an intensity during the awake state.

15. The method of claim 13, further comprising:

measuring, via a light detector circuit, an ambient light level; and controlling a button backlight circuit in response to the measured ambient light level.

16. The method of claim 15, further comprising adjusting an intensity of the button backlight circuit during the idle state in response to the measured ambient light level.

17. A method comprising:

sampling a temperature signal, the temperature signal indicating a temperature in a space around a temperature control device;

determining, in an idle state, a sampled temperature based on the temperature signal;

storing, in the idle state, the sampled temperature in memory;

controlling, in the idle state, an internal electrical load to a first state;

receiving an actuation of a button;

in response to receiving the actuation, transitioning from the idle state to an awake state;

controlling, in the awake state, the internal electrical load to a second state, wherein the internal electrical load consumes more power in the second state than in the first state;

ceasing sampling of the temperature signal, in the awake state;

retrieving, in the awake state, the sampled temperature stored in the memory during the idle state;

comparing the retrieved sampled temperature to a set point temperature; and based on comparing the retrieved sampled temperature to the set point temperature, controlling an HVAC system.

18. The method of claim 17, wherein controlling, in the idle state, the internal electrical load to the first state comprises decreasing a duty cycle of a button backlight circuit in response to a measured ambient light level.

19. The method of claim 17, wherein retrieving, in the awake state, the sampled temperature stored in the memory during the idle state comprises retrieving a most recent sampled temperature stored in the memory.

* * * * *